United States Patent
Verheyden

(10) Patent No.: US 10,451,812 B2
(45) Date of Patent: Oct. 22, 2019

(54) ADAPTER SHUTTER WITH INTEGRATED CONNECTOR LOCK

(71) Applicant: COMMSCOPE CONNECTIVITY BELGIUM BVBA, Kessel-Lo (BE)

(72) Inventor: Danny Willy August Verheyden, Gelrode (BE)

(73) Assignee: CommScope Connectivity Belgium BVBA, Kessel-Lo (BE)

( * ) Notice: Subject to any disclaimer, the term of this patent is extended or adjusted under 35 U.S.C. 154(b) by 0 days.

(21) Appl. No.: 15/775,812

(22) PCT Filed: Nov. 11, 2016

(86) PCT No.: PCT/EP2016/077505
§ 371 (c)(1),
(2) Date: May 11, 2018

(87) PCT Pub. No.: WO2017/081300
PCT Pub. Date: May 18, 2017

(65) Prior Publication Data
US 2018/0329153 A1      Nov. 15, 2018

Related U.S. Application Data

(60) filed as application No. PCT/EP2016/077505 on Nov. 11, 2016.
(Continued)

(51) Int. Cl.
*G02B 6/38*    (2006.01)
*G02B 6/42*    (2006.01)

(52) U.S. Cl.
CPC ......... *G02B 6/3825* (2013.01); *G02B 6/3849* (2013.01); *G02B 6/3893* (2013.01); *G02B 2006/4297* (2013.01)

(58) Field of Classification Search
None
See application file for complete search history.

(56) References Cited

U.S. PATENT DOCUMENTS 5,727,101 A * 3/1998 Giebel ................. G02B 6/3834
                                                            385/59
6,206,577 B1    3/2001 Hall, III et al.
(Continued)

FOREIGN PATENT DOCUMENTS

EP     0 697 607 A1    2/1996
EP     0 927 898 A2    7/1999
(Continued)

OTHER PUBLICATIONS

Kumoro et al., Machine Translation of Description of JP 2013-007841 A, Jan. 2013.*
(Continued)

*Primary Examiner* — Michelle R Connelly
(74) *Attorney, Agent, or Firm* — Merchant & Gould P.C.

(57) ABSTRACT

The present disclosure relates to fiber optic connection systems (5) including a fiber optic adapter (10) having shutter assemblies (34, 17) for obstructing laser beams to protect a person's eyes. The shutter assemblies (34, 17) are spring biased and pivotally movable between closed and open positions. In certain examples, the shutter assemblies (34, 17) can include an integrated locking member (48) that snaps into the fiber optic connectors (12, 14) to hold/retain the connectors in first and second ports (20, 24).

21 Claims, 9 Drawing Sheets

Related U.S. Application Data

(60) Provisional application No. 62/255,171.

(56) References Cited

U.S. PATENT DOCUMENTS

| | | | |
|---|---|---|---|
| 6,425,694 | B1 | 7/2002 | Szilagyi et al. |
| 6,561,699 | B1 | 5/2003 | De Marchi |
| 6,715,930 | B2 | 4/2004 | McBride |
| 8,821,031 | B2 | 9/2014 | Lin et al. |
| 8,851,763 | B2 | 10/2014 | Lin et al. |
| 9,625,657 | B2 | 4/2017 | Ott |
| 9,638,868 | B2 | 5/2017 | Ott |
| 9,798,092 | B2 * | 10/2017 | Leigh .................... G02B 6/4296 |
| 2011/0198324 | A1 * | 8/2011 | de Jong ................. G02B 6/245 |
| | | | 219/121.72 |
| 2014/0072265 | A1 | 3/2014 | Ott |

FOREIGN PATENT DOCUMENTS

| | | | | |
|---|---|---|---|---|
| EP | 0697607 | B1 * | 9/1999 | ........... G02B 6/3825 |
| JP | 5097068 | B2 | 12/2012 | |
| JP | 2013-007841 | A | 1/2013 | |
| JP | 2013007841 | A * | 1/2013 | ......... H01R 13/4536 |
| WO | 2012/112344 | A1 | 8/2012 | |
| WO | 2013/117598 | A2 | 8/2013 | |
| WO | 2015/048198 | A1 | 4/2015 | |
| WO | 2016/043922 | A1 | 3/2016 | |
| WO | 2016/100384 | A1 | 6/2016 | |

OTHER PUBLICATIONS

International Search Report and Written Opinion of the International Searching Authority for corresponding International Patent Application No. PCT/EP2016/077505 dated Jan. 31, 2017, 12 pages.
"The 3M™ Volition™ VF-45™ Interconnect an Emerging Standard for High-Speed Fiber to the Desktop", 3M Telecom System Division, 18 pages (admitted as prior art as of Nov. 13, 2015).

* cited by examiner

ADAPTER SHUTTER WITH INTEGRATED CONNECTOR LOCK

CROSS-REFERENCE TO RELATED APPLICATION

This application is a National Stage Application of PCT/EP2016/077505, filed on Nov. 11, 2016, which claims the benefit of U.S. patent application Ser. No. 62/255,171, filed on Nov. 13, 2015, the disclosures of which are incorporated herein by reference in their entireties. To the extent appropriate, a claim of priority is made to each of the above disclosed applications.

TECHNICAL FIELD

The present disclosure relates generally to optical adapters for optically coupling together optical fiber tips of optical or copper connectors. More particularly, the present disclosure relates to optical adapters with a pivotally mounted shutter assembly including an integrated lock.

BACKGROUND

Optical adapters are used to optically couple together optical fiber tips of optical connectors. The optical adapters include an alignment structure that aligns the fiber tips to enable the transfer of optical signals therebetween. Optical connectors can be secured to the optical adapters when received at the ports of the optical adapters.

Fiber optic communication systems are becoming prevalent in part because service providers want to deliver high bandwidth communication capabilities (e.g., data and voice) to customers. Fiber optic communication systems employ a network of fiber optic cables to transmit large volumes of data and voice signals over relatively long distances using a high power diode laser to launch a laser beam into the optical fiber. The high power laser beam used to carry information is usually invisible. As such, the human eyes will be unable to sense the high power laser beam if it leaves from an open end of a fiber cable.

While shutters have been used in the prior art to obstruct light beams emitted, improvements are desirable in this area.

SUMMARY

Aspects of the present disclosure relate to features for obstructing light beams as a safety attribute of protecting eyes of persons nearby. One aspect in accordance with the principles of the present disclosure relates to a fiber optic adapter that includes an adapter body having a front end with a first port and an opposite rear end. The first port can be configured to receive a first fiber optic connector. The fiber optic adapter also includes a front shutter assembly including first and second front shutter plates. The first and second front shutter plates can be rotatably mounted at the front end of the adapter body of the fiber optic adapter. Each one of the first and second front shutter plates can be moveable between a closed position where the first and second front shutter plates cover the first port, and an open position where the first and second front shutter plates are rotated inside of the adapter body of the fiber optic adapter such that the first port is exposed for receiving the first fiber optic connector. The fiber optic adapter further includes a locking member on each one of the first and second front shutter plates. The locking member on each one of the first and second front shutter plates are for engaging first inner cavities on opposite sides of the first fiber optic connector as each one of the first and second front shutter plates are moved from the closed position to the open position so as to lock the first fiber optic connector in place in the first port.

Another aspect of the present disclosure relates a fiber optic connection system including first and second fiber optic connectors each having a connector body with a front end and an opposite rear end. An optical fiber extends through the connector body from the rear end to the front end. The optical fiber has a fiber end accessible at the front end of the connector body. The fiber optic connection system includes an adapter that has an adapter body for coupling the first and second fiber optic connectors together such that optical signals can be conveyed between optical fibers of the first and second fiber optic connectors. The adapter body has a first end with a first port and an opposite second end with a second port. The first and second ports can be configured to respectively receive the first and second fiber optic connectors. The fiber optic connection system also includes front and rear shutter assemblies that each include first and second shutter plates respectively mounted at the first and second ends. The front and rear shutter assemblies can be movable between an open position as the first and second fiber optic connectors are inserted into respective first and second ports and a closed position as the first and second fiber optic connectors are removed from respective first and second ports. In the closed position, the front and rear shutter assemblies can cover the first and second ports respectively and in the open position the front and rear shutter assemblies can expose the first and second ports for respectively receiving first and second fiber optic connectors.

A variety of additional inventive aspects will be set forth in the description that follows. The inventive aspects can relate to individual features and to combinations of features. It is to be understood that both the forgoing general description and the following detailed description are exemplary and explanatory only and are not restrictive of the broad inventive concepts upon which the embodiments disclosed herein are based.

BRIEF DESCRIPTION OF THE DRAWINGS

The accompanying drawings, which are incorporated in and constitute a part of the description, illustrate several aspects of the present disclosure. A brief description of the drawings is as follows.

DETAILED DESCRIPTION

Reference will now be made in detail to exemplary aspects of the present disclosure that are illustrated in the accompanying drawings. Wherever possible, the same reference numbers will be used throughout the drawings to refer to the same or like parts.

Aspects of the present disclosure relate to fiber optic adapters that are used to optically and mechanically couple two fiber optic connectors. When the two fiber optic connectors are inserted within respective coaxially aligned ports of the fiber optic adapter, shutters pivotally mounted on the fiber optic adapters are moved toward an open position thereby rotating inside of the fiber optic adapter. While in the open position, locking members on the shutters lock the two fiber optic connectors in their respective ports.

Figure 1:
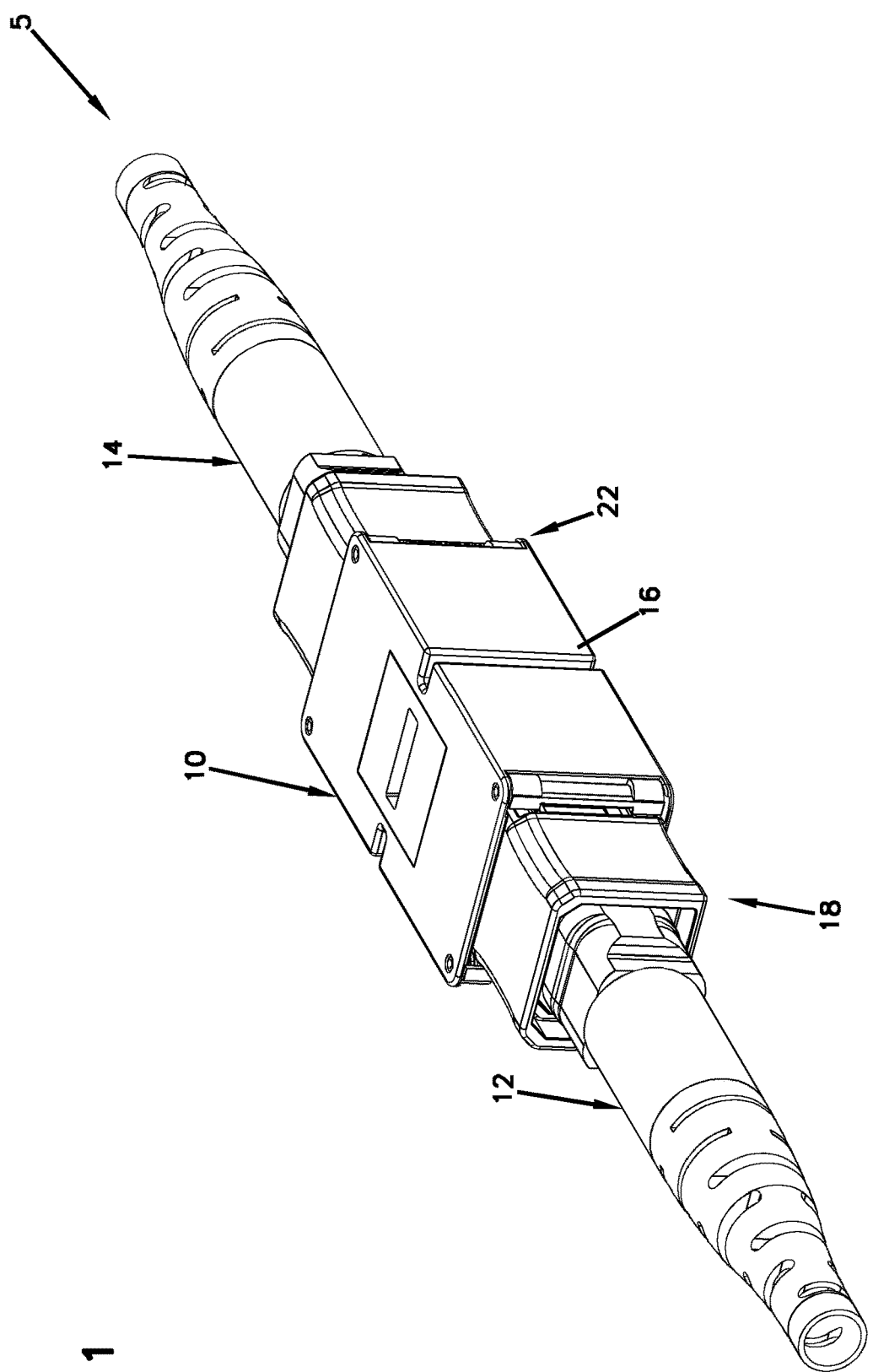
FIG. 1 is a perspective view of an example fiber optic connection system including a fiber optic adapter and fiber optic connectors in accord with the principles of the present disclosure.

FIG. 1 illustrates a fiber optic connection system 5 including an example fiber optic adapter 10 and first and second fiber optic connectors 12, 14 in accordance with the principles of the present disclosure. The fiber optic connection system 5 can be used throughout a fiber optic network, from a central office up to connectivity in a user's home. It can also be used for optical connections and for copper connections.

As depicted, the fiber optic adapter 10 is a double-ended receptacle for optically and mechanically coupling first and second fiber optic connectors 12, 14. The fiber optic adapter 10 includes an adapter body 16 having a front end 18 with a first port 20 (see FIG. 6) and an opposite rear end 22 with a second port 24 (see FIG. 6). The first and second ports 20, 24 are configured to respectively receive the first and second fiber optic connectors 12, 14. The first port 20 can be configured for receiving the first fiber optic connector 12 in a direction of arrow "A", and the second port 24 can be configured for receiving the second fiber optic connector 14 (e.g., mating connector) in a direction of arrow "B". The fiber optic adapter 10 shown includes two sets of similar features at the front and rear ends 18, 22 of the adapter body 16. For simplicity, only one set of these features will be described in detail. It is to be understood that the features of the front end 18 of the adapter body 16 are equally applicable to the rear end 22 of the adapter body 16.

Figure 2:
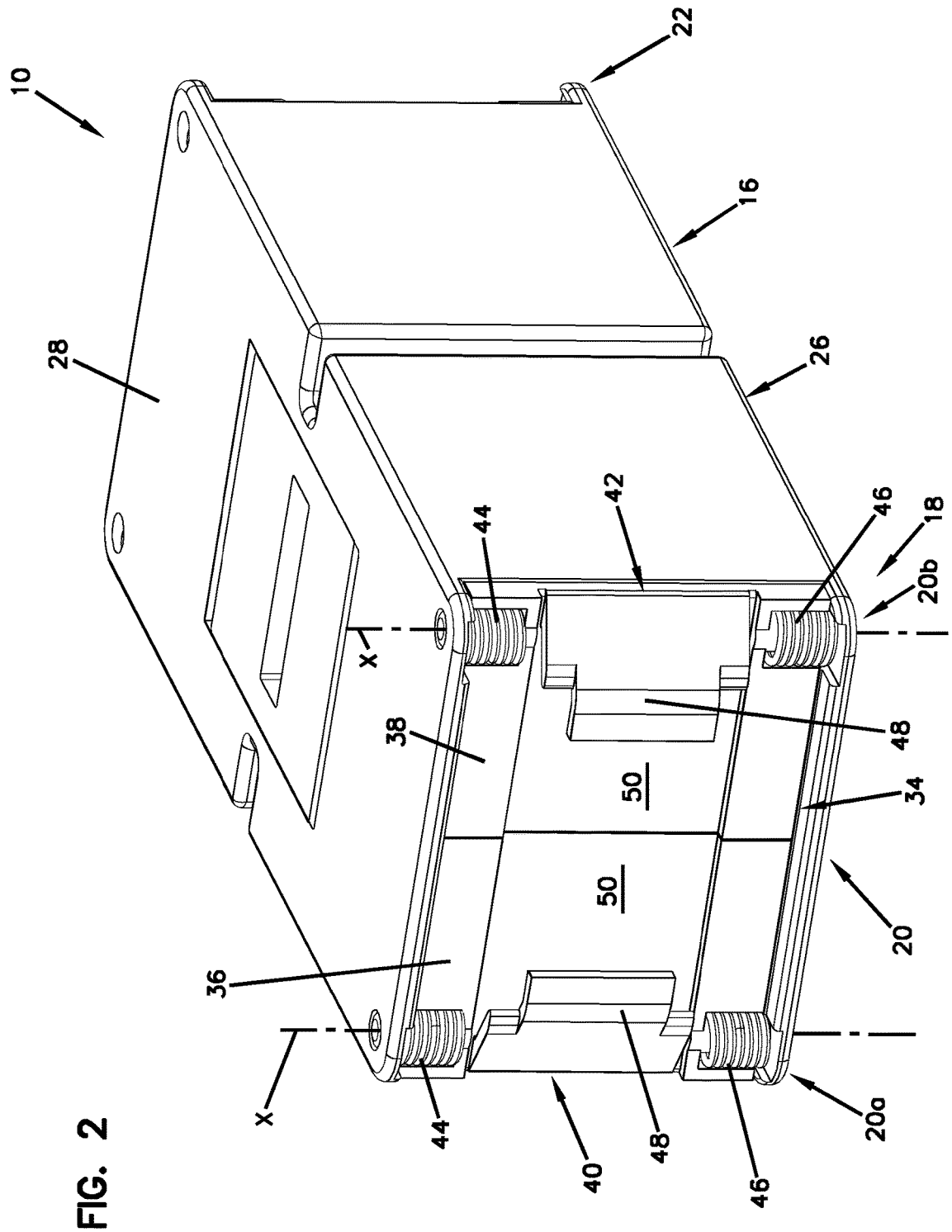
FIG. 2 is a perspective view of the fiber optic adapter shown in FIG. 1, the fiber optic adapter is shown with a shutter assembly in a closed position.
Figure 3:
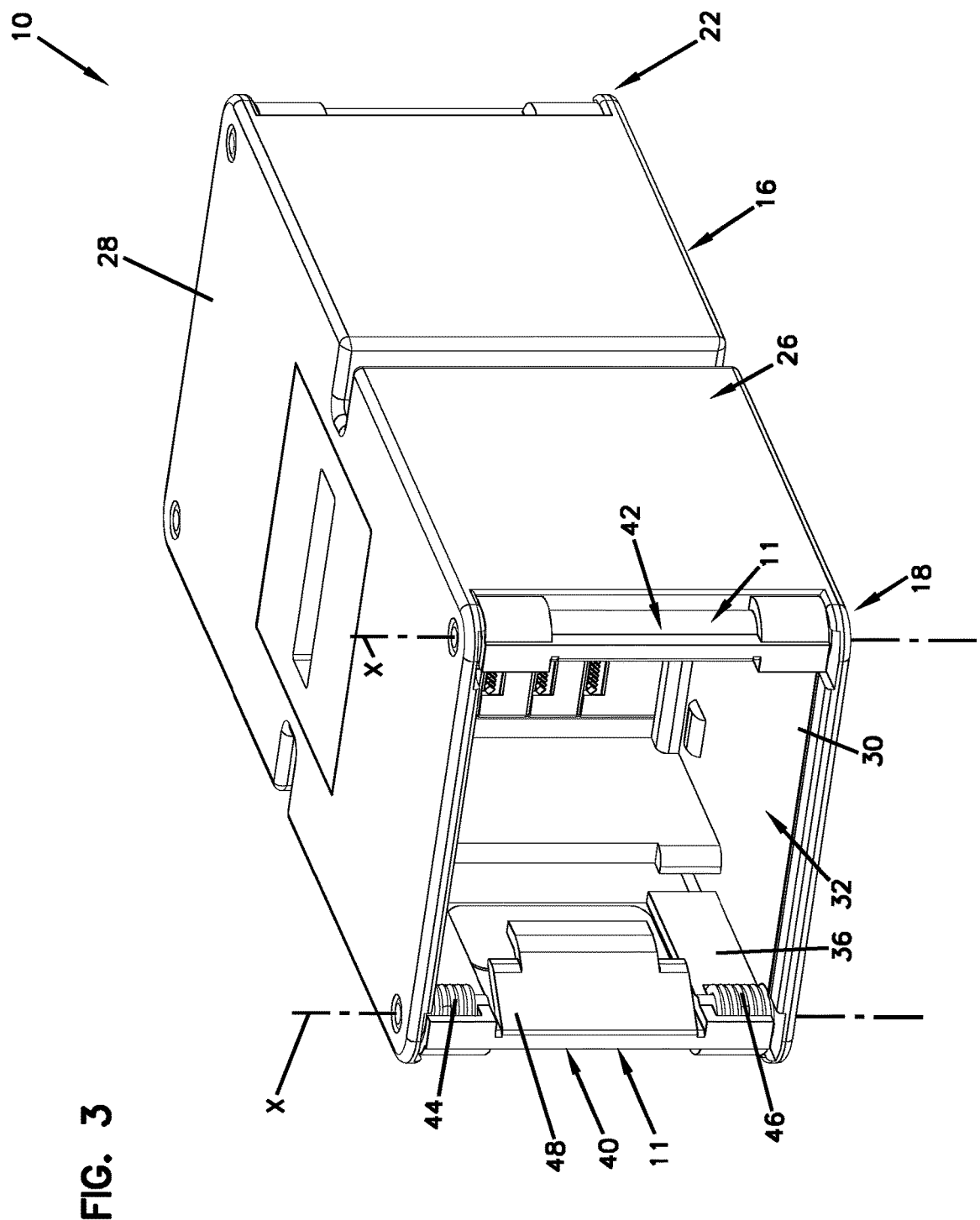
FIG. 3 is a perspective view of the fiber optic adapter shown in FIG. 1, the fiber optic adapter is shown with the shutter assembly in an open position.

Referring to FIGS. 2-3, the example fiber optic adapter 10 includes opposite side walls 26, a top wall 28, and a bottom wall 30 (see FIG. 3) that together define an interior region 32 of the adapter body 16. The fiber optic adapter 10 includes an example front shutter assembly 34 (and an example rear shutter assembly 17 (see FIG. 6) with the same features) having first and second front shutter plates 36, 38 that are rotatably mounted on opposite sides of the first port 20 at the front end 18 of the adapter body 16. The first front shutter plate 36 being mounted to a left side 20a of the first port 20 at a left pivot connection 40. The second front shutter plate 38 being mounted to a right side 20b of the first port 20 at a right pivot connection 42.

The first and second front shutter plates 36, 38 are generally planar or flat. It will be appreciated that the first and second front shutter plates 36, 38 can have an alternate shape, for example an oval or circular shape. Although a pair of shutters 36, 38 is shown in FIG. 2, it will be appreciated that a single shutter may also be used to completely cover the first and second ports 20, 24. Moreover, it will be appreciated that more than one pair of shutters 36, 38 can be used.

The left and right pivot connections 40, 42 allow for pivoting movement of the first and second front shutter plates 36, 38 respectively around a pivot axis shown at X. As depicted, the pivot axis X of the first and second front shutter plates 36, 38 are parallel to each other. The left and right pivot connections 40, 42 can include biasing structures such as first and second springs 44, 46 for respectively biasing the first and second front shutter plates 36, 38 toward a closed position (see FIG. 2). Thus, no special action is required to close the first and second front shutter plates 36, 38. The first and second front shutter plates 36, 38 can be moved against the spring bias toward an open position (see FIG. 3). The first and second springs 44, 46 can be coiled springs coiled along the pivot axis X and formed of a known material, although alternatively any known spring for urging the first and second front shutter plates 36, 38 towards the open and closed positions can be used. In one aspect, the first and second springs 44, 46 can each be wrapped around a pivot rod (not shown) respectively formed with the first and second front shutter plates 36, 38. In other examples, the left and right pivot connections 40, 42 can each be formed by a pivot rod (not shown) extending through a portion of the left and right pivot connections 40, 42, or alternatively it can be formed in any other known manner.

Although the first and second front shutters 36, 38 are shown as being supported by a hinge 11 on opposite sides of the first port 20 for pivotally attaching the first and second front shutters 36, 38 at the front end 18 of the adapter body 16, it will be appreciated that either a greater or lesser number of hinges may be used for each of the first and second front shutters 36, 38.

The first and second front shutter plates 36, 38 can each pivot about the pivot axis X between the open position and the closed position. In the closed position, the first and second front shutter plates 36, 38 are co-planar such that the first port 20 is completely covered. In the open position, the first and second front shutter plates 36, 38 are parallel such that the first port 20 is exposed. The first and second front shutter plates 36, 38 can each rotate inside of the adapter body 16 of the fiber optic adapter 10 when moved toward the open position of FIG. 3. The design of the first and second front shutter plates 36, 38 is such that it does not cause any interference with other network elements in the environment.

As depicted, the fiber optic adapter 10 can include a locking member 48 that extends over a major surface 50 of each one of the first and second front shutter plates 36, 38. In certain examples, the locking member 48 can be on the major surface 50 of the first and second front shutter plates 36, 38. The locking member 48 on the major surface 50 of each one of the first and second front shutter plates 36, 38 may face outwardly from the first port 20 when the first and second front shutter plates 36, 38 are spring biased in the closed position of FIG. 2, although alternatives are possible. In the closed position, the first and second front shutter plates 36, 38 can block laser radiation exiting the fiber optic adapter 10 thereby preventing it from harming a person's eyes. Each locking member 48 can be integrally formed as a single unitary piece with its corresponding front or rear shutter plates, although alternatives are possible.

Figure 4:
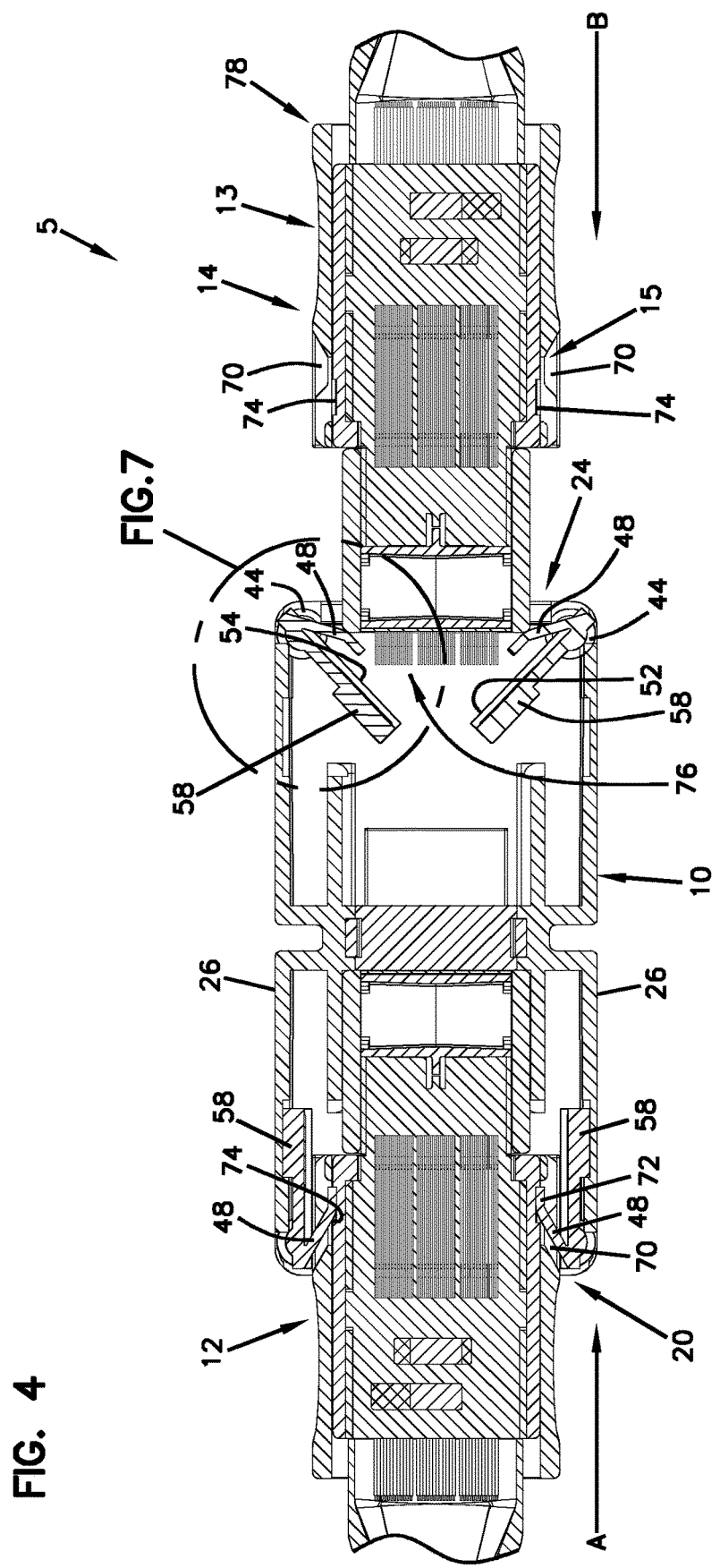
FIG. 4 illustrates one of the fiber optic connectors of FIG. 1 in the process of being inserted into the fiber optic adapter.

FIG. 4 is a top cross-sectional view of the fiber optic connection system 5. FIG. 4 shows the fiber optic adapter 10 with the first fiber optic connector 12 already loaded in the first port 20 and the second fiber optic connector 14 in the process of being inserted into the second port 24. When a user mates the second fiber optic connector 14 with the fiber optic adapter 10, the second fiber optic connector 14 can be simply inserted into the second port 24 such that the rear shutter assembly 17 including first and second rear shutter plates 52, 54 are pivoted inwardly and away from their closed position inside the adapter body 16.

Figure 5:
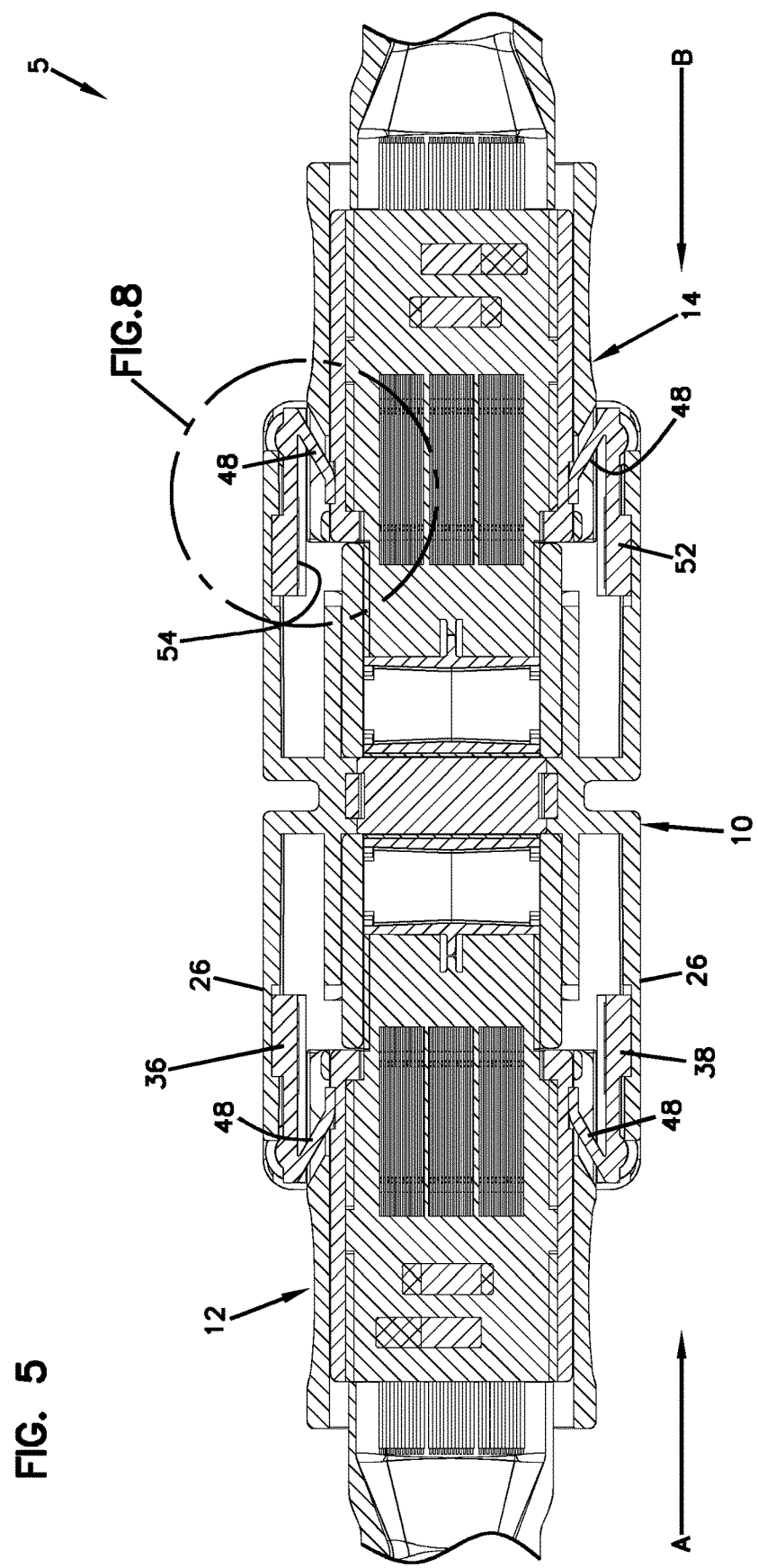
FIG. 5 illustrates the fiber optic connectors of FIGS. 1 and 4 fully inserted within the fiber optic adapter.

FIG. 5 is a top cross-sectional view of the fiber optic connection system 5 illustrating the second fiber optic connector 14 fully inserted within the fiber optic adapter 10. Upon pulling out the second fiber optic connector 14 from the fiber optic adapter 10, the first and second rear shutter plates 52, 54 are pivoted about the first and second springs 44, 46 to flex out of the adapter body 16 and completely cover the second port 24. Although this process has been illustrated relative to the second fiber optic connector 14, it will be appreciated that the same features and description can be applicable to the first fiber optic connector 12.

Figure 6:
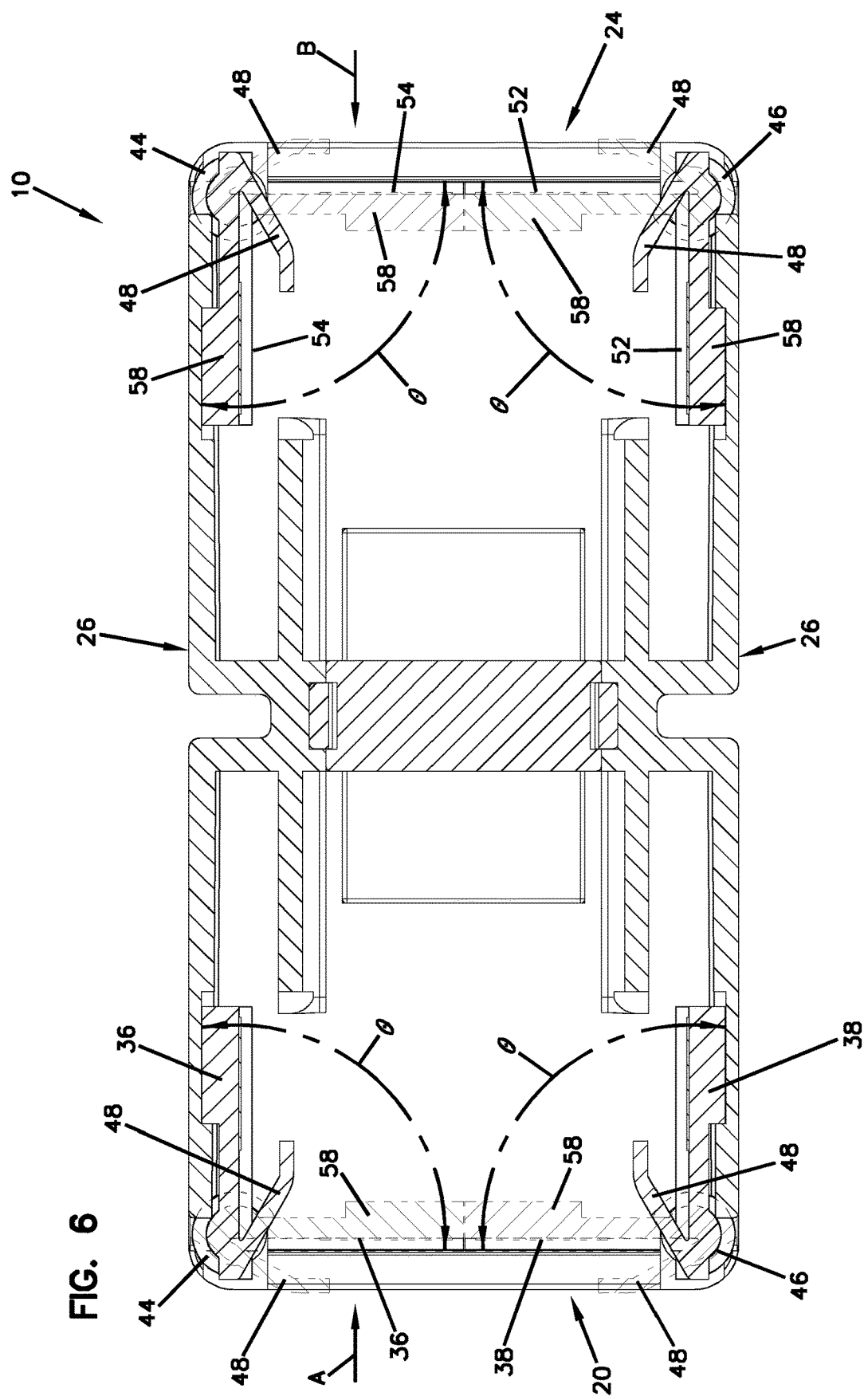
FIG. 6 is a cross-sectional view of the fiber optic adapter of FIG. 1 illustrating the pivotal movement of the shutter assembly in accord with the principles of the present disclosure.

Referring to FIG. 6, a top cross-sectional view of the fiber optic adapter 10 is illustrated. The first and second front shutter plates 36, 38 and the first and second rear shutter plates 52, 54 are depicted as being able to be pushed inwardly to the open position (i.e., illustrating the shutter plates 36, 38 52, 54 as solid lines) or spring biased outwardly to the closed position (i.e., illustrating the shutter plates 36, 38 52, 54 as dotted lines) by the insertion or withdrawal of the first and second fiber optic connectors 12, 14 respectively. The first and second front shutter plates 36, 38 and the first and second rear shutter plates 52, 54 being pivotally rotated about an angle θ.

Figure 7:
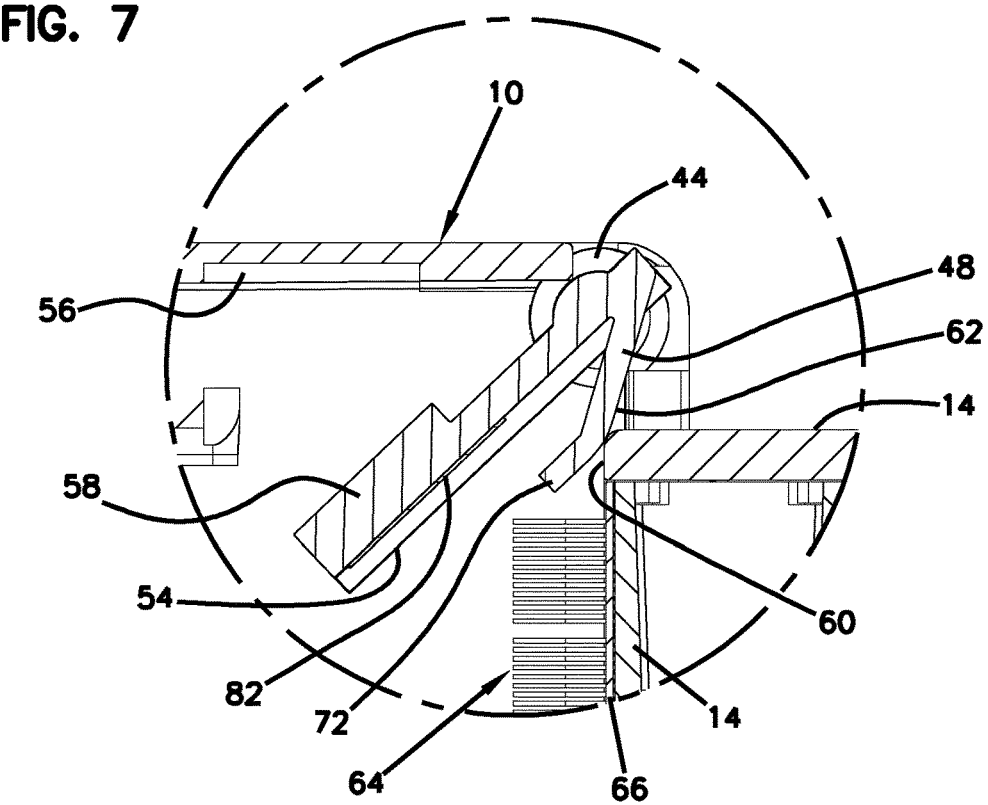
FIG. 7 is an enlarged view of a portion of the shutter assembly of the fiber optic connection system as depicted in FIG. 4.

FIG. 7 is an enlarged view of the second rear shutter plate 54 shown in FIG. 4. Although the second rear shutter plate 54 is described and depicted, the same principles can apply to the first rear shutter plate 52 and the first and second front shutter plates 36, 38. The fiber optic adapter 10 defines inner cavities 56 (i.e., first and second inner cavities) in the opposite side walls 26.

Typically, the retention force of the shutters are transferred to the hinges 11. As such, the hinge 11 can be sized and designed to accommodate such retention force. The inner cavities 56 are formed to receive and cooperate with projections 58 extending from each of the shutter plates 36, 28 to absorb some of the retention force exerted on the hinges 11. Therefore, engagement of the projection 58 with the inner cavity 56 can help to accommodate the retention force so that less retention force is transferred to the hinge 11 and the size of the hinge 11 can be reduced. It will be appreciated that the first and second front shutter plates 36, 38 and the first rear shutter plate 52 can each include the projection 58.

During insertion, the second fiber optic connector 14 pushes against the first and second rear shutter plates 52, 54 moving the first and second rear shutter plates 52, 54 from the closed position to the open position. As such, the first and second rear shutter plates 54 pivot about the pivot axis X and rotate inwardly into the adapter body 16 making way for the second fiber optic connector 14 to be received in the second port 24. The projection 58 of the first and second rear shutter plates 54 engages the inner cavities 56 on opposite sides of the fiber optic adapter 10 when in the fully inserted position.

Figure 8:
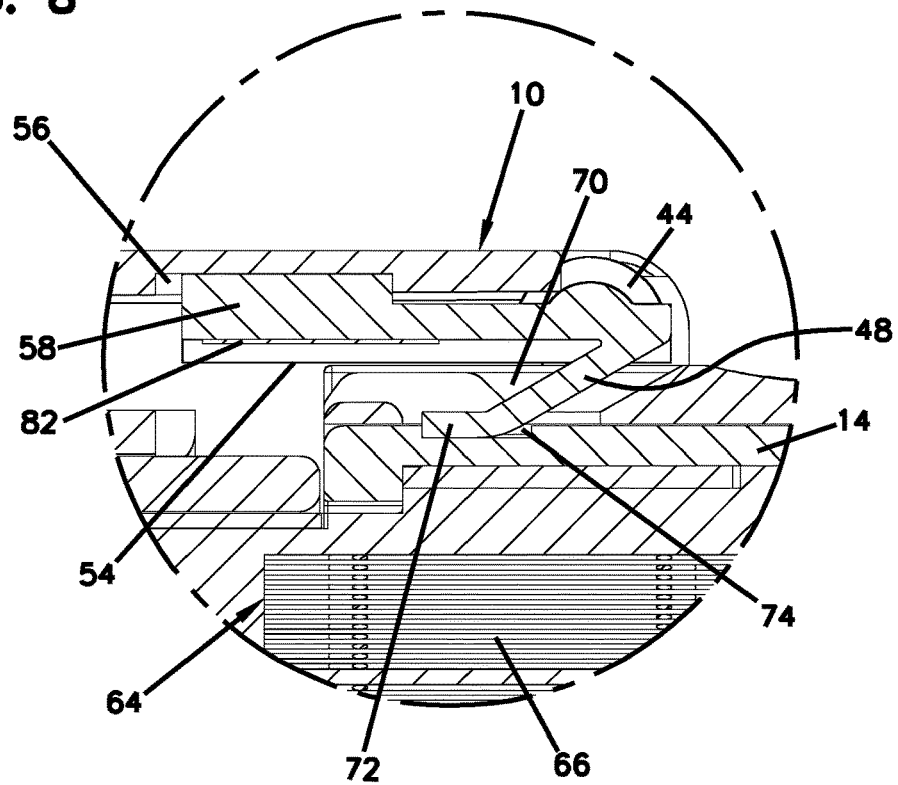
FIG. 8 is an enlarged view of a portion of the shutter assembly of the fiber optic connection system as depicted in FIG. 5.

FIG. 8 is an enlarged view of the second rear shutter plate 54 shown in FIG. 5 with the second fiber optic connector 14 completely inserted in the fiber optic adapter 10. As the second fiber optic connector 14 is inserted into the second port 24, a distal end face 60 (see FIG. 7) of the second fiber optic connector 14 contacts an outer surface 62 (see FIG. 7) of the locking member 48 and rides thereon to push the first and second rear shutter plates 52, 54 inwardly moving them from the closed position toward the open position. When the second fiber optic connector 14 is inserted into the second port 24 of the fiber optic adapter 10, the locking member 48 slides respectively along the second fiber optic connector 14 to approach an access groove 70 formed on opposite sides of the second fiber optic connector 14. The locking member 48 can have elastic properties such that it is mounted (e.g., snap fitted) into the access groove 70 and a retention element 72 of the locking member 48 is fitted within a recess 74 defined by the second fiber optic connector 14 on opposite sides thereof.

The retention element 72 can be used to releasably secure the second fiber optic connector 14 within the second port 24. In other words, the retention element 72 can be used for holding/retaining the second fiber optic connector 14 within the second port 24. To unlock, an outer housing 13 (see FIG. 4) of the second fiber optic connector 14 can be pulled back, which unlocks the locking member 48 from an inner housing 15 (see FIG. 4) of the second fiber optic connector 14. As shown, the retention element 72 of the locking member 48 is integrally formed as a single unitary piece with its respective first and second front and rear shutter plates 36, 38, 52, 54. Such a design can help to reduce parts and ultimately cost.

Figure 9:
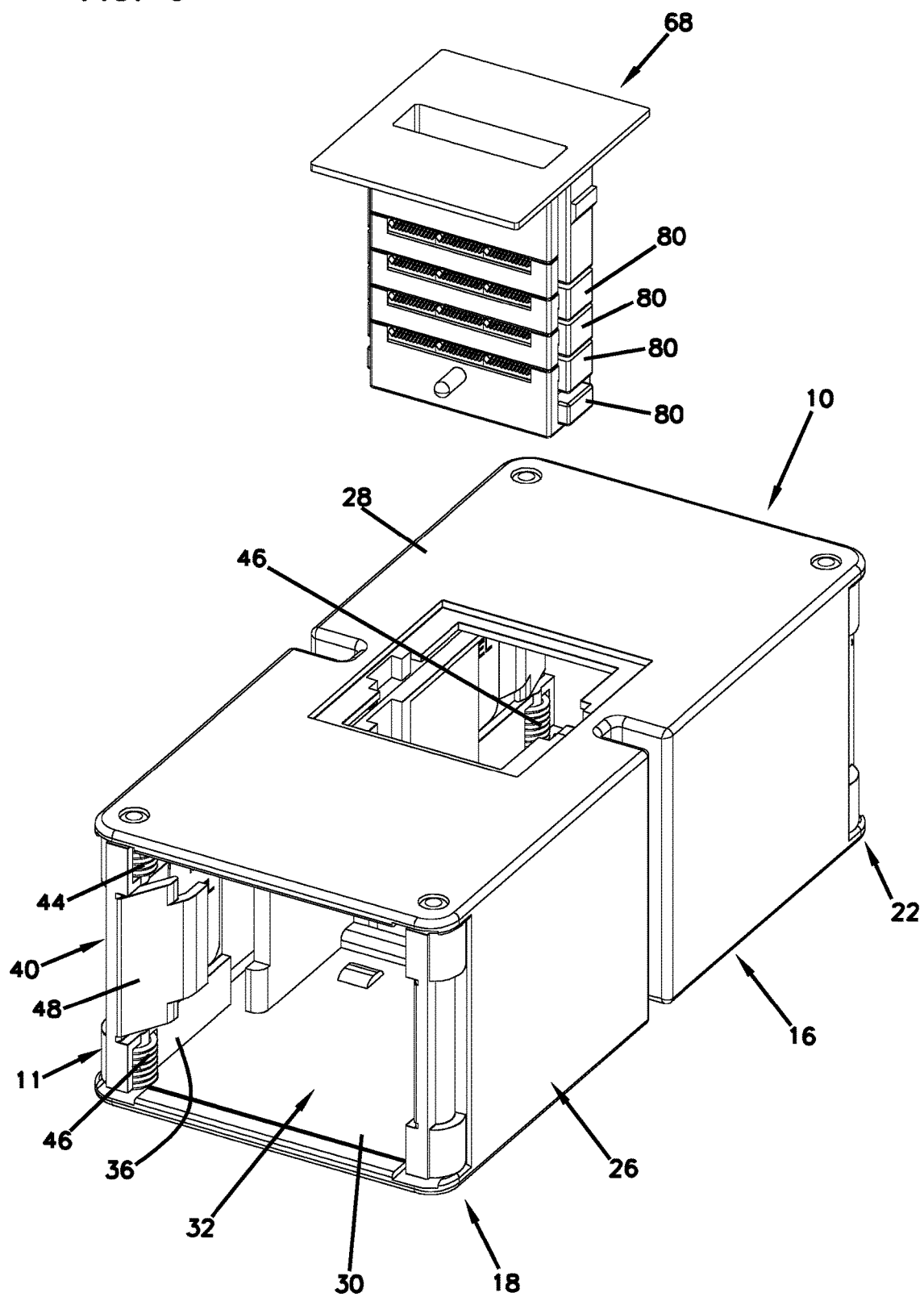
FIG. 9 is a perspective view of the fiber optic adapter shown in FIG. 3 showing an alignment device with fiber alignment trays removed from the fiber optic adapter.

With the first and second front shutter plates 36, 38 and the first and second rear shutter plates 52, 54 in the open position and the first and second fiber optic connectors 12, 14 fully inserted in the fiber optic adapter 10, front end portions 64 (e.g., fiber ends) of a plurality of optical fibers 66 can abut one another and be held in co-axial alignment by an alignment device 68 (see FIG. 9). The alignment device 68 can be positioned generally at the center of the fiber optic adapter 10.

In one aspect, the first and second fiber optic connectors 12, 14 can each include a connector body 19 with a first end 76 and an opposite second end 78. The plurality of optical fibers 66 can extend respectively therethrough from the first end 76 to the second end 78 of the first and second fiber optic connectors 12, 14. The front end portions 64 of each one of the plurality of optical fibers 66 can be accessible at the first end 76 of the first and second fiber optic connectors 12, 14.

Figure 10:
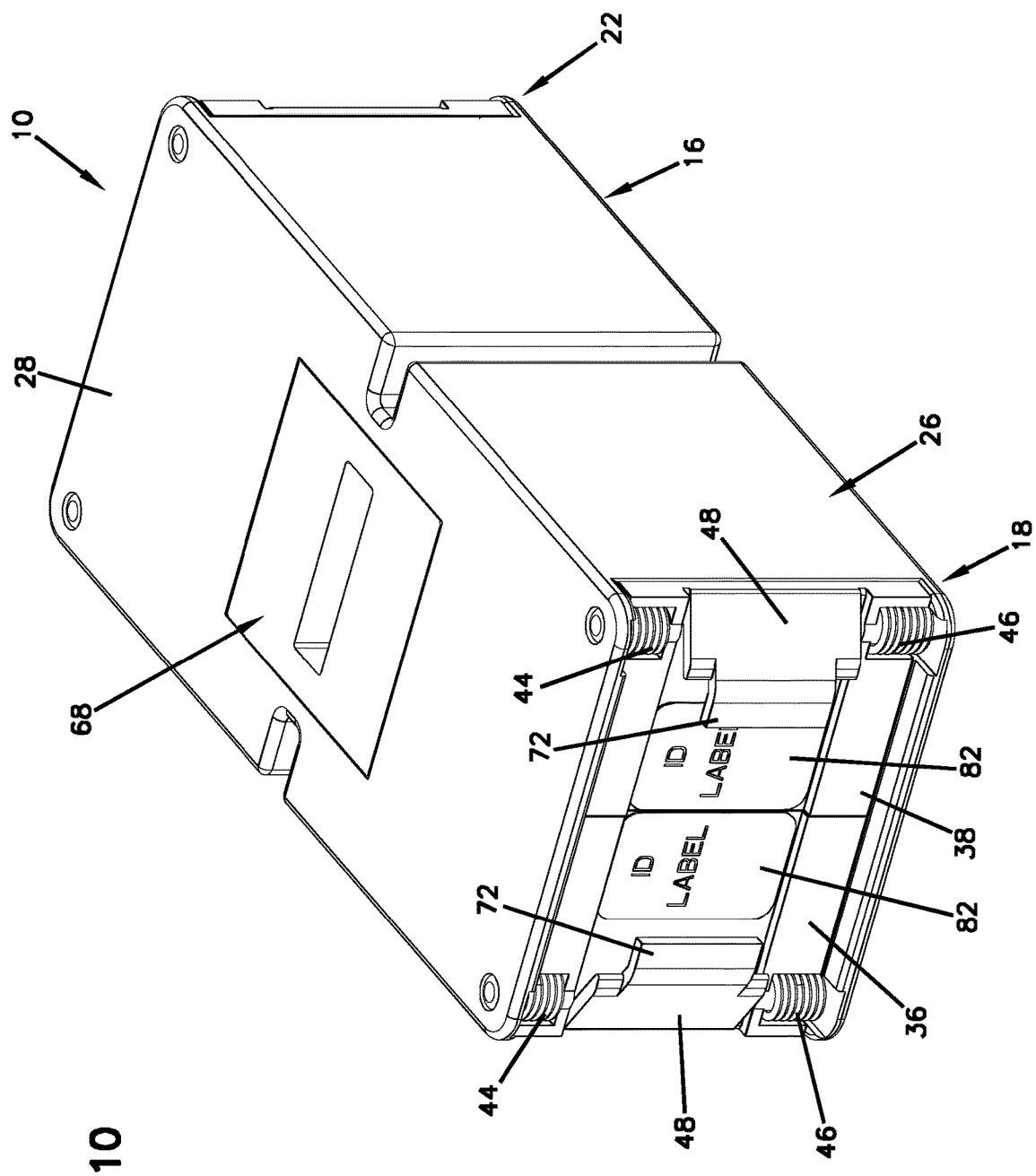
FIG. 10 is a perspective view of the fiber optic adapter shown in FIG. 2 showing an identification plate on the shutter assembly in accord with the principles of the present disclosure.

By pulling the second fiber optic connector 14 at the second end 78, the retention element 72 of the locking member 48 can be disengaged from the recess 74 of the second fiber optic connector 14 to permit removal of the second fiber optic connector 14 from the second port 24. Upon pulling out the second fiber optic connector 14, the first and second rear shutter plates 52, 54 will quickly spring outwardly from within the fiber optic adapter 10 to the closed position such that any light beams being emitted can be obstructed. FIG. 10 shows the fiber optic adapter 10 with an identification plate 82 (e.g., label or tag) on the major surface 50 of the first and second front shutter plates 36, 38. In other examples, the first and second front shutter plates 36, 38 may include an embossed ID on the major surfaces 50 thereof. The unique identification can be used by the installer to determine which adapter needs to be used during installation.

In accordance with the present disclosure, the rear shutter assembly 17 can be described in a similar way to include the features and advantages of the front shutter assembly 34 described above and vice versa.

In certain examples, the alignment device 68 can coaxially align the optical fibers of the first fiber optic connector 12 with the optical fibers of a corresponding second fiber optic connector 14 desired to be coupled via the fiber optic adapter 10. In certain examples, the alignment device 68 includes a stack of fiber alignment trays 80 that define an array of alignment grooves (e.g., V-grooves, not shown) for receiving the front end portions 64 of the optical fibers 66 when the first and second fiber optic connectors 14, 16 are respectively inserted within the first and second ports 20, 24.

The first and second fiber optic connectors 12, 14 can have any known physical format including but not limited to known LC, SC, SC Duplex, MTRJ formats, or other types of connectors. It will be appreciated that a variety of other adapters may be used.

From the forgoing detailed description, it will be evident that modifications and variations can be made without departing from the spirit and scope of the disclosure.

PARTS LIST

5—Fiber optic connection system
10—Fiber optic adapter
11—Hinges
12—First fiber optic connector
13—Outer housing
14—Second fiber optic connector
15—Inner housing
16—Adapter body
17—Rear shutter assembly
18—Front end
19—Connector body
20—First port
20a—Left side
20b—Right side
22—Rear end
24—Second port
26—Opposite side wall
28—Top wall
30—Bottom wall
32—Interior region
34—Front shutter assembly
36—First front shutter plate
38—Second front shutter plate
40—Left pivot connection
42—Right pivot connection
44—First spring
46—Second spring
48—Locking member
50—Major surface
52—First rear shutter plate
54—Second rear shutter plate
56—Inner cavities
58—Projection
60—Distal end face
62—Outer surface
64—Front end portions
66—Plurality of optical fibers
68—Alignment device
70—Access Groove
72—Retention element
74—Recess
76—First end
78—Second end
80—Fiber alignment trays
82—Identification Plate

What is claimed is:

1. A fiber optic adapter comprising:
an adapter body having a front end with a first port and an opposite rear end, the first port being configured to receive a first fiber optic connector;
a front shutter assembly including first and second front shutter plates, the first and second front shutter plates being rotatably mounted at the front end of the adapter body of the fiber optic adapter, each one of the first and second front shutter plates being moveable between a closed position where the first and second front shutter plates cover the first port, and an open position where the first and second front shutter plates are rotated inside of the adapter body of the fiber optic adapter such that the first port is exposed for receiving the first fiber optic connector;
a locking member included on each one of the first and second front shutter plates, each locking member having a retention element on each one of the first and second front shutter plates for engaging a recess on opposite sides of the first fiber optic connector as each one of the first and second front shutter plates are moved from the closed position to the open position so as to lock the first fiber optic connector in place in the first port; and
wherein the first and second front shutter plates include outer surfaces that face away from the first port when the first and second front shutter plates are in the closed position, and wherein the locking members are provided at the outer surfaces and include flexible cantilever latches configured to elastically flex relative to the first and second front shutter plates.

2. The fiber optic adapter of claim 1, wherein the first and second front shutter plates are rotated into the adapter body as the first and second front shutter plates move from the closed position toward the open position, and wherein the first and second front shutter plates flex outwardly from the adapter body as the first and second front shutter plates are spring biased toward the closed position.

3. The fiber optic adapter of claim 2, wherein the first and second front shutter plates pivot relative to the adapter body as the first and second front shutter plates move between the closed and open positions.

4. The fiber optic adapter of claim 1, wherein each locking member is integrally formed as a single unitary piece with its corresponding front shutter plate.

5. The fiber optic adapter of claim 1, further comprising a second port at the rear end of the adapter body of the fiber optic adapter configured to receive a second fiber optic connector.

6. The fiber optic adapter of claim 5, further comprising a rear shutter assembly including first and second rear shutter plates, the first and second rear shutter plates being rotatably mounted at the rear end of the adapter body of the fiber optic adapter, each one of the first and second rear shutter plates being moveable between a closed position where the first and second rear shutter plates cover the second port, and an open position where the first and second rear shutter plates are rotated inside of the adapter body of the fiber optic adapter such that the second port is exposed to receive the second fiber optic connector.

7. The fiber optic adapter of claim 6, wherein each one of the first and second rear shutter plates includes the locking member with the retention element for engaging the recess on opposite sides of the second fiber optic connector as each one of the first and second rear shutter plates are moved from the closed position to the open position to lock the second fiber optic connector in place in the second port.

8. The fiber optic adapter of claim 1, further comprising hinges on opposite sides of the first port for pivotally attaching the first and second front shutters at the front end of the adapter body.

9. The fiber optic adapter of claim 1, wherein the first fiber optic connector has a first end and an opposite second end, the first fiber optic connector including a plurality of optical fibers extend therethrough from the first end to the second end of the first fiber optic connector, the plurality of optical fibers each having front end portions accessible at the first end of the first fiber optic connector.

10. The fiber optic adapter of claim 9, wherein the fiber optic adapter includes a stack of fiber alignment trays for receiving front end portions of the plurality of optical fibers.

11. The fiber optic adapter of claim 1, further comprising an identification plate on each one of the first and second front shutter plates.

12. A fiber optic connection system comprising:
first and second fiber optic connectors each including:
a connector body having a first end and an opposite second end;
an outer housing that mounts on the connector body and that is slideable relative to the connector body;
an optical fiber that extends through the connector body from the second end to the first end, the optical fiber having front end portions accessible at the first end of the connector body;
a fiber optic adapter having an adapter body for coupling the first and second fiber optic connectors together such that optical signals can be conveyed between optical fibers of the first and second fiber optic connectors, the adapter body having a front end with a first port and an opposite rear end with a second port, the first and second ports being configured to respectively receive the first and second fiber optic connectors; and
front and rear shutter assemblies respectively mounted at the front and rear ends, the front and rear shutter assemblies each including first and second shutter plates movable between an open position as the first and second fiber optic connectors are inserted into respective first and second ports and a closed position as the first and second fiber optic connectors are removed from respective first and second ports;
wherein in the closed position, the front and rear shutter assemblies cover the first and second ports respectively and in the open position the front and rear shutter assemblies expose the first and second ports for respectively receiving the first and second fiber optic connectors; and
wherein each one of the first and second shutter plates of the front and rear shutter assemblies includes a locking member, each locking member being configured for respectively engaging retention surfaces on opposite sides of the first and second fiber optic connectors as each one of the first and second shutter plates of the front and rear shutter assemblies are moved from the closed position to the open position for respectively locking the first and second fiber optic connectors in the first and second ports; and
wherein the first and second fiber optic connectors are released from their respective first and second parts by pulling back on the outer housing relative to the connector bodies to cause the locking members to disengage from the retention surfaces.

13. The fiber optic connection system of claim 12, wherein each one of the first and second shutter plates of the front and rear shutter assemblies are moved into the adapter body as the first and second shutter plates of the front and rear shutter assemblies move from the closed position toward the open position, and wherein the first and second shutter plates of the front and rear shutter assemblies flex outwardly from the adapter body as the first and second shutter plates of the front and rear shutter assemblies are spring biased toward the closed position.

14. The fiber optic connection system of claim 13, wherein the first and second shutter plates of the front and rear shutter assemblies pivot relative to the adapter body as the first and second shutter plates of the front and rear shutter assemblies move between the closed and open positions.

15. The fiber optic connection system of claim 12, wherein each locking member is integrally formed as a single unitary piece with its corresponding first and second shutter plate of the front and rear shutter assemblies.

16. The fiber optic connection system of claim 12, further comprising hinges on opposite sides of each one of the first and second ports for pivotally attaching each one of the first and second shutter plates of the front and rear shutter assemblies respectively at the front and rear ends of the adapter body.

17. The fiber optic connection system of claim 12, wherein the first and second fiber optic connectors each has a first end and an opposite second end, the first and second fiber optic connectors each including a plurality of optical fibers that extend therethrough from the first end to the second end, the plurality of optical fibers each having front end portions accessible at the first end of the first and second fiber optic connectors.

18. The fiber optic connection system of claim 17, wherein the fiber optic adapter includes a stack of fiber alignment trays for receiving the front end portions of the plurality of optical fibers.

19. The fiber optic connection system of claim 12, further comprising an identification plate on each one of the first and second shutter plates of the front and rear shutter assemblies.

20. The fiber optic adapter of claim 12, wherein the first and second front shutter plates of the front and rear shutter assemblies each include a projection respectively configured to engage an inner cavity on opposite sides of the fiber optic adapter at the front and rear ends thereof when the first and second front shutter plates are moved from the closed position toward the open position.

21. The fiber optic connection system of claim 12, wherein the retention surfaces are oriented perpendicular relative to a direction of insertion of the first and second fiber optic connectors.

* * * * *

UNITED STATES PATENT AND TRADEMARK OFFICE
CERTIFICATE OF CORRECTION

PATENT NO. : 10,451,812 B2  
APPLICATION NO. : 15/775812  
DATED : October 22, 2019  
INVENTOR(S) : Danny Willy August Verheyden Page 1 of 1

It is certified that error appears in the above-identified patent and that said Letters Patent is hereby corrected as shown below:

On the Title Page

Page 2, item (60): "62/255,171." should read --62/255,171, filed on Nov. 13, 2015.--

Signed and Sealed this
Eleventh Day of May, 2021

Drew Hirshfeld
*Performing the Functions and Duties of the
Under Secretary of Commerce for Intellectual Property and
Director of the United States Patent and Trademark Office*